United States Patent [19]
Collins

[11] Patent Number: 5,890,313
[45] Date of Patent: Apr. 6, 1999

[54] FISHING ROD BUTT AND REEL SEAT ASSEMBLY

[76] Inventor: Stuart Collins, 526 NE. 190th St., North Miami Beach, Fla. 33179

[21] Appl. No.: 870,694

[22] Filed: Jun. 6, 1997

[51] Int. Cl.⁶ .......................... A01K 87/00; A01K 87/06
[52] U.S. Cl. ........................................ 43/20; 43/22; 43/23
[58] Field of Search ................................ 43/18.1, 20, 22, 43/23, 18.5

[56] References Cited

U.S. PATENT DOCUMENTS

| | | | |
|---|---|---|---|
| 4,050,179 | 9/1977 | Johnson | 43/22 |
| 4,083,141 | 4/1978 | Shedd | 43/23 |
| 4,467,548 | 8/1984 | Tabor | 43/23 |
| 4,637,157 | 1/1987 | Collins | 43/23 |
| 4,646,460 | 3/1987 | Rumbaugh | 43/20 |
| 4,884,356 | 12/1989 | Yasui | 43/23 |
| 5,522,169 | 6/1996 | Heller | 43/23 |

*Primary Examiner*—Jack W. Lavinder
*Attorney, Agent, or Firm*—Malloy & Malloy, P.A.

[57] ABSTRACT

The present invention is directed towards an improved fishing butt and reel seat assembly and comprises a substantially strong, rigid, one piece rod having a first open end, a second open end and a main length extending therebetween with a hollow interior in communication with both open ends having a substantially constant inner diameter. The rod includes a reel seat portion and a shank portion. The reel seat portion preferably includes an abutment section with an enlarged exterior diameter disposed generally adjacent the shank portion. The exterior diameter of the abutment section is larger than that of both the reel seat portion and the shank portion. The invention additionally comprises a gripping sleeve having a first and a second open end and a main length sized to generally correspond the shank portion of the rod for being slidably mounted and secured thereon, and a gimbal structured to be slidably inserted into the second open end of rod corresponding the shank portion in abutting engagement with the second end of the gripping sleeve. Finally, the invention additionally comprises an externally threaded zone on the rod, at least one locking nut threadably mounted thereto and at least one annular hood mounted onto the reel seat portion of the rod, preferably on said abutment section.

13 Claims, 2 Drawing Sheets

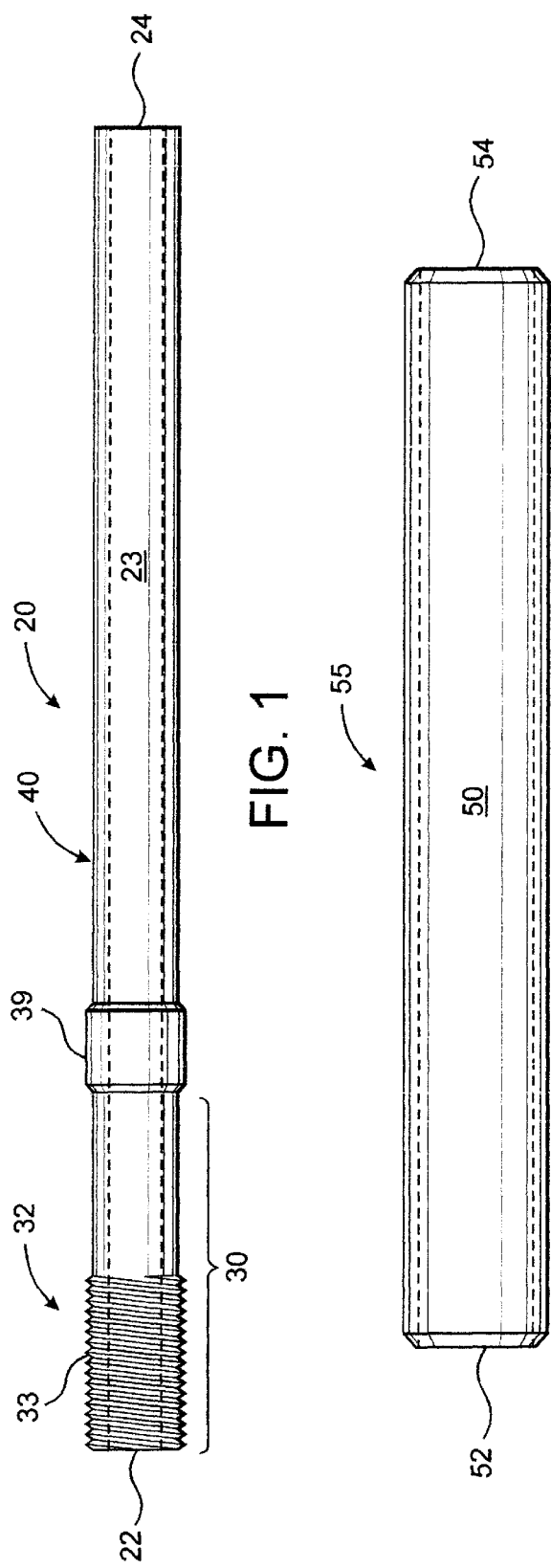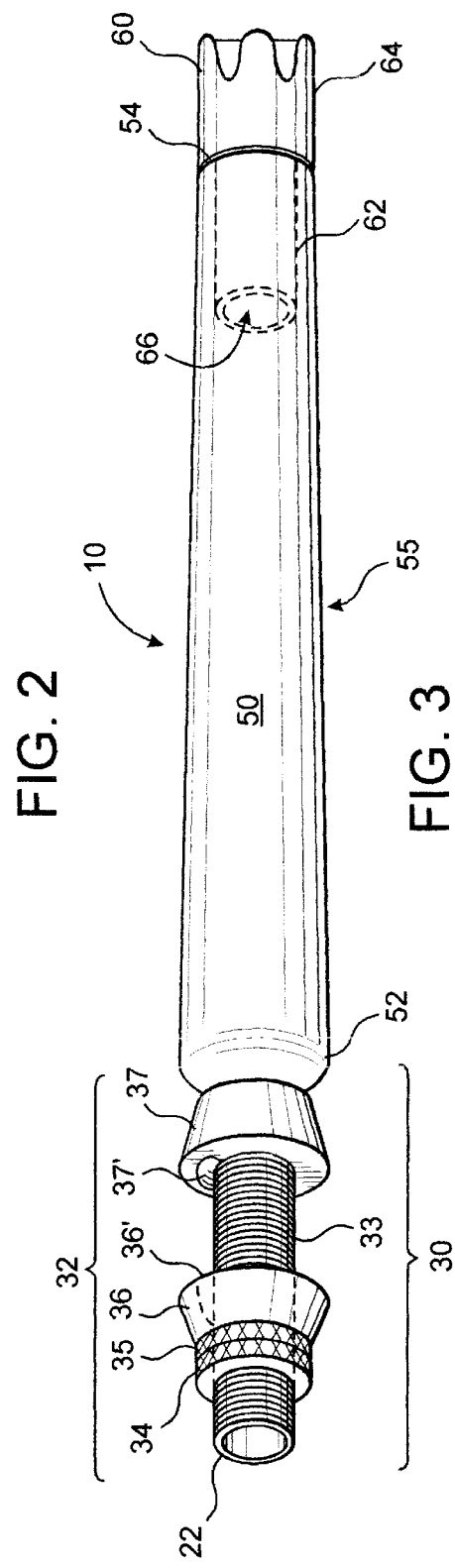

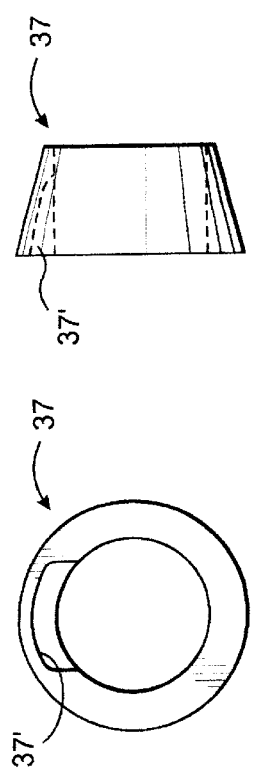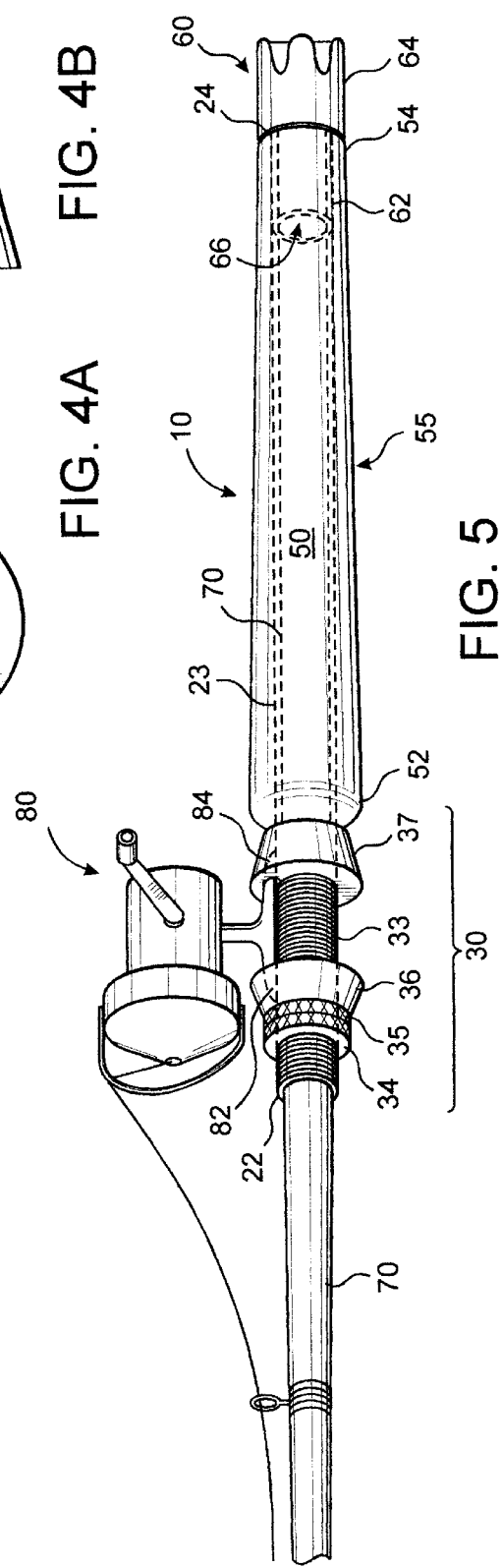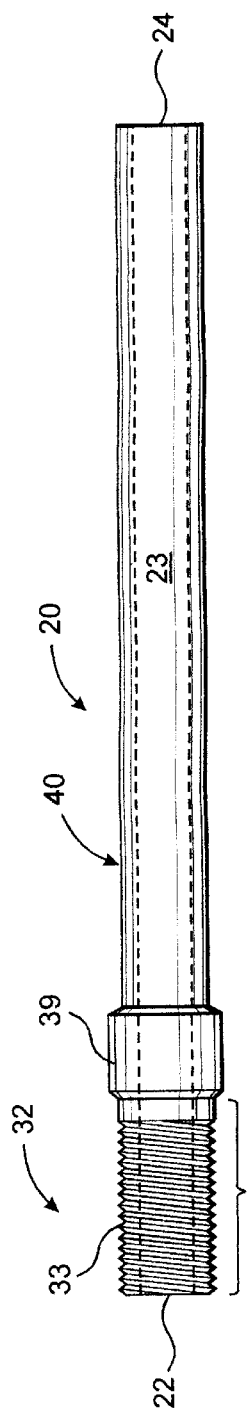

FISHING ROD BUTT AND REEL SEAT ASSEMBLY

BACKGROUND OF THE INVENTION

1. Field of the Invention

The present invention relates generally to fishing rods and more particularly, to a fishing rod butt and reel seat assembly for use in receiving and supporting a fishing rod and fishing reel thereon that is structured to reduce manufacturing costs and assembly time while providing at the same time, a substantially strong device able to withstand the large bending forces, loads, stresses and otherwise heavy duty use to which such devices are often subjected.

2. Description of the Related Art

Most conventional fishing rods used for deep sea sport fishing are made of three primary sections, the rod blank, the handle or butt, and the reel seat. Typically, the rod blank is elongate and defines the distal end of the rod, which is intended to be fitted within the butt. The reel seat is commonly secured directly to the butt rather than to the fishing rod itself. The end of the butt is frequently in the form of a gimbal having intersecting notches, and therefore, the distal end of the butt is specifically configured to be received within a socket permanently but movably mounted on a "fighting chair" on a boat or even on a "fighting belt" secured to a fisherman. In the sport of game fishing, strong forces are often encountered, which forces are transmitted through the rod to the butt assembly. Many fishing rods are not able to withstand the tremendous stress associated with deep sea fishing and have a tendency to break under the high load conditions inherent in the sport. Given the enormous amount of stress and "bending forces" placed on the butt assembly, it is imperative that its construction and design be adequate to withstand the aforementioned forces and to maintain a certain amount of structural integrity throughout its life.

Various fishing butt and reel seat assemblies have been designed in the past to overcome the tendency to break under the high load conditions present in the sport of game fishing. Many of these prior art devices are constructed from a plurality of intricate machined or interlocking parts in order to increase the structural strength and durability of the fishing butt assembly. A recurring problem however, is that the manufacturing process for such devices is labor intensive and costly. In an effort to reduce the increased costs associated with such multi-part butt assemblies, others have designed unitary or one piece fishing butt and reel seat assemblies. Known unitary designs however, are viewed as having problems in terms of their structural integrity and ability to adequately withstand the heavy duty use to which they are exposed. Alternatively, the materials used to construct known unitary fishing butt assemblies often hinder the performance of the fisherman or are simply unreliable. For instance, in order to provide a unitary fishing butt assembly which is sufficiently strong to meet the structural demands of the sport, some prior art devices form the entire fishing butt structure out of a sturdy, solid metallic material, which results in the device being slippery, heavy, cumbersome and only expedient to the fatiguing of the fisherman. In addition, such devices are expensive given the need for metal finishing. Even further, such devices are susceptible to rapid heating and becoming too hot to handle, particularly given that most deep sea fishing occurs in highly sunny conditions with no shade available. Consequently, many such devices utilize insulating materials such as foam, cork or wood to form a gripping surface for the user and to protect the user's hands from the heat conductive metals. A problem frequently encountered in such devices is that the metallic and insulating materials have different thermal expansion coefficients and therefore, expand and contract at different rates, which has resulted in the cracking and general deterioration of the insulating material.

It would be therefore be highly advantageous to provide a unitary fishing butt and reel seat assembly which overcomes the afore-mentioned problems in the art. Specifically, it would be highly beneficial to provide a unitary fishing butt and reel seat assembly which minimizes the costs and assembly time associated with manufacturing such a device while at the same time, maintaining the structural integrity of the device necessary to withstand the large bending forces and loads which such devices are subjected to. It would also be highly beneficial to provide such a unitary fishing butt and reel seat assembly which offers an insulative material sleeve which can accommodate the different thermal expansion rates of the materials used in the device and which could be easily replaced.

SUMMARY OF THE INVENTION

The present invention is directed towards an improved fishing butt and reel seat assembly designed to address the needs which remain in the art. The fishing butt and reel seat assembly of the present invention comprises a substantially strong, rigid, one piece rod having a first open end and a second open end and a main length extending therebetween, which is preferably hollow, in open communication with the open ends, and of a circular cross section. The rod of the present invention includes a reel seat portion and a shank portion. The reel seat portion is sized to receive a reel seat thereon and thus, includes means for securely receiving and retaining a fishing reel thereon which means are movably mounted on the reel seat portion. Preferably, the reel seat portion further defines an abutment section having an enlarged exterior diameter and which is located generally adjacent the shank portion of the rod. The fishing butt and reel seat assembly of the present invention further comprises a gripping sleeve, the gripping sleeve having a first open end, a second open end and a main tubular body extending therebetween and being sized to generally correspond the shank portion of the rod. The gripping sleeve is structured to be slidably mounted on and secured to the shank portion of the rod so as to be disposed in abutting engagement with the abutment section of the reel seat portion, and is preferably formed of a substantially rigid yet light weight insulative material. The fishing butt and reel seat assembly of the present invention further comprises a gimbal having an insert end structured and disposed to be press-fitted into the second open end of the rod and a trailing head portion structured to abut the second open end of the gripping sleeve and the rod shank portion. Upon assembly, a fishing rod blank can then be inserted into the first open end of the rod for use in game fishing.

It is an object of the present invention to provide an improved fishing butt and reel seat assembly comprising an integral, one-piece shaft and reel seat so as to reduce the materials utilized, assembly time needed and the overall costs required in the manufacture of known assemblies.

An advantage of the present invention is that the reel seat and shank portions can be entirely formed by one machine instead of by several machines as is required of prior art devices.

A feature of the present invention is that the gripping sleeve can be slidably mounted onto the shank portion of the rod and can be removed and replaced with another gripping sleeve, if desired.

It is a further object of the present invention to provide a fishing butt and reel seat assembly which is strong and durable so as to withstand the stress and bending forces encountered during sport fishing.

It is also an object of the present invention to provide a fishing butt and reel seat assembly which is sufficiently strong and stress resistant and yet, which will not be heavy, cumbersome nor fatiguing to the fisherman utilizing the invention.

Yet another of the present invention is to provide a fishing butt and reel seat assembly wherein the materials used to construct the invention will be tolerant of the different rates of thermal expansion.

These and other objects, features and advantages of the present invention will become more apparent from the following more detailed description and the appended drawings.

BRIEF DESCRIPTION OF THE DRAWINGS

For a fuller understanding of the nature of the present invention, reference should be had to the following detailed description taken in connection with the accompanying drawings in which:

FIG. 1 is a side view of the integral, one-piece rod according to the present invention which includes both a reel seat portion and a shank portion.

FIG. 2 is a side view of the gripping sleeve according to the present invention.

FIG. 3 is a perspective view illustrating the fishing butt and reel seat assembly of the present invention in assembled form with a gimbal but without either a fishing rod blank or a fishing reel.

FIG. 4A is a front view and FIG. 4-B is a side view of one form of the means for securely receiving and retaining a fishing reel on the reel seat portion of the invention.

FIG. 5 is a partial perspective view of the fishing butt and reel seat assembly according to the present invention, in fully assembled form showing both a fishing rod blank and a fishing reel mounted thereto.

FIG. 6 is an enlarged, side view of the integral, one piece rod illustrated in FIG. 1.

Like reference numerals refer to like parts throughout the several views of the drawings.

DETAILED DESCRIPTION OF THE PREFERRED EMBODIMENT

Shown throughout FIGS. 1–6, the present invention is directed towards an improved fishing butt and reel seat assembly, generally indicated as 10. The assembly is seen to comprise an elongate rod 20, including a reel seat portion 30 and a shank portion 40, a gripping sleeve 50, and a gimbal 60.

Referring to FIG. 1, the invention is seen to comprise an elongate, substantially strong, rigid, one piece rod 20, which has an open first end 22, an open second end 24 and a main length 23 extending between the first and second ends, which is preferably circular in its cross section. In the preferred embodiment, the rod is formed of a high strength metallic material, such as steel, although most preferably, a high strength but substantially light weight metallic material will be used such as aluminum. Also in the preferred embodiment, the interior of the rod 20 is hollow, in open communication with open ends 22 and 24, and has a substantially constant inner diameter to accommodate the insertion of a fishing rod blank 70 into open first end 22 and into the hollow interior of the main length 23.

The rod 20 of the present invention is seen to include a reel seat portion 30 which is structured and sized to receive a fishing reel 80 thereon. The reel seat portion 30 includes retaining means 32 for securely retaining the fishing reel on the reel seat portion 30 in the desired position. In the preferred embodiment, the retaining means 32 comprise in part, a threaded zone 33 formed on the outer surface of the first rod end 22, which threaded zone ideally extends from first rod end 22 and onto reel seat portion 30 by generally about between one to three inches. In this preferred embodiment, the threaded zone 33 interacts with additional retaining means, as described below. The reel seat portion 30 of the present invention further includes an abutment section 39, the purpose of which will become clear from the explanation below. Abutment section 39 is preferably located generally adjacent to the shank portion 40 of the rod 20, and is preferably characterized by a section on the rod length 23 which has an enlarged exterior diameter, as best illustrated in FIGS. 1 and 6. In the most preferred embodiment, the abutment section is generally about one inch in length and is generally raised from the outer surface of the rod to have an enlarged exterior diameter of generally about one inch. If it is desired to utilize the present invention with oversize fishing rods, the exterior diameter of the abutment section could be made to be larger although the other portions of the invention would be proportionately enlarged so as to keep the various portions uniform.

The present invention comprises additional retaining means 32 for securely retaining the fishing reel on the reel seat portion 30 in the desired position. Preferably, the additional retaining means are movable with respect to the rod 20 and reel seat portion 30 to permit some adjustment so as to accommodate variously sized fishing reels. In the preferred embodiment, the additional retaining means 32 comprise at least one locking nut 34 and at least one annular hood 37. In the most preferred embodiment however, there are a pair of locking nuts, 34 and 35, and a pair of annular hoods, 36 and 37, the latter of which will be discussed first. As shown in FIGS. 4–A and 4–B, each annular hood comprises a one-piece cylindrical ring which includes a slot 36' or 37' configured to receive a leg 82 or 84 of a conventional fishing reel 80. To accomplish assembly of the retaining means, a first annual hood 37 is mounted onto rod end 22 and may be slid downwardly over the reel seat portion 30 and into snug engagement on or over the abutment section 39, to act as a lower hood. Preferably, however, annular hood 37 is sized and configured to be so tightly fit onto abutment section 39 that is must be "press fit" into place and will remain that way perhaps permanently. Second hood 36 is also mounted onto rod end 22 and is slid downwardly and onto reel seat portion 30 where it may slide freely until a fishing reel 80 is received thereon whereupon, it will function as an upper hood, see FIG. 5. Still referring to FIG. 5, in order to position a fishing reel 80 on reel seat portion 30, one leg 84 of the fishing reel 80 is placed in a slot 37' of the first annular hood 37' and the other leg 82 of the fishing reel 80 is placed in a slot 36' of the second annular hood 36. At this point, at least one of the locking nuts, such as 35, is mounted onto rod end 22 and is threaded in the same downwardly direction into snug engagement with upper hood 36. Preferably however, and given that the vibration from the boat or even a generator thereon might loosen the lock nut 35, a second lock nut 34 will also be mounted onto rod end 22 and threaded in the same downwardly direction into snug engagement with first lock nut 35 so as to prevent all movement thereof and to securely maintain the fishing reel 80 on the reel seat portion 30 even during the application of enormous stress while being utilized in deep sea fishing.

Referring again to FIGS. 1 and 6, the elongate, one piece rod 20 of the present invention further includes a shank portion 40. In the preferred embodiment, shank portion 40 extends generally from reel seat portion 30 and ideally, from abutment section 39, and is generally greater in length than reel seat portion 30 as this is the portion which will be handled and will act as a lever in fighting a hooked fish. Preferably, the shank portion 40 is left unfinished during the manufacture process so as to include a roughened surface, to further save on manufacturing time and actually serve a useful purpose, which will soon become clear. In the most preferred embodiment, the roughened surface comprises a series of small grooves and ridges thereon or even a scoring thereacross, which in no way interfere with the structural integrity of the rod 20. From the foregoing description, it will be appreciated that the elongate, one piece rod 20, including the reel seat portion 30 and the shank portion 40 can be formed rather easily from a single machine during the manufacturing process such as a conventional lathe or a turret lathe. More specifically, the rod 20 as well as the reel seat and shank portions 30 and 40 are formed of and from a single elongate rod of metallic material so as to have substantially the same inner diameter and an external diameter that varies in three areas with a different texture on two of those three, and consequently, one machine can be used to make the requisite number of passes so as to form same in one set-up. Those of ordinary skill in the art will recognize this as effecting a major reduction in the costs associated with manufacturing such devices as less materials are required, less time is necessary, and little assembly is required.

Referring now to FIG. 2, the present invention is seen to further include a gripping sleeve 50. Gripping sleeve 50, includes a first end 52, a second end 54 and a main length 55 extending between ends 52, 54. Gripping sleeve 50 is structured to be slidably mounted onto the shank portion 40 into abutting engagement with the enlarged exterior diameter of abutment section 39, and is sized to generally correspond the length of shank portion 40. To accomplish this, it should be clear that gripping sleeve 50 has an internal diameter which is larger than the external diameter of the shank portion 40 and yet which is smaller than the external diameter of the abutment section 39. It should also be clear from FIG. 3 that in assembled form, the lower hood 37 is also in abutting engagement with the first end 52 of the gripping sleeve 50. In a more preferred embodiment, the gripping sleeve is formed to include a textured appearance so as to offer a better grip to the fisherman that eventually uses the product, even when his hands are wet and/or a bit slimy. Also, given the harsh and straining forces at work on the assembly during deep sea fishing, the gripping sleeve 50 should be securely mounted onto the shank portion 40, and to accomplish this, an adhesive material such as a bonding cement or semi-rigid or flexible epoxy is coated onto the shank portion 40, so as to cover the roughened surface thereof, prior to the mounting of the gripping sleeve 50 onto shank portion 40. It will of course be appreciated by those skilled in the art that the internal diameter of gripping sleeve 50 is larger than the exterior diameter of the shank portion 40 so as to provide some room for the adhesive agent applied to bond more effectively and in this regard, if the shank portion has been left with a roughened surface such as a series of ridges or grooves, this will further aid the bonding action of the adhesive agent. Also, because the internal diameter of the gripping sleeve 50 is larger than the external diameter of the shank portion 40, the space which is occupied by the adhesive agent can further act as a cushion between the shank portion of the rod 20 and the gripping sleeve 50, to help protect the device despite the rigorous forces to which it is subjected during deep sea fishing. Preferably, the internal diameter of the gripping sleeve 50 will not be significantly larger than the external diameter of the shank portion 40, and ideally the difference will be generally about $5/1000$'s to $10/1000$'s of an inch. As has been described, most deep sea fishing occurs in highly sunny conditions with no shade available and therefore, the present invention may be exposed to a natural heating element, namely the sun's rays. Accordingly, the gripping sleeve 50 is preferably constructed of an insulative material which will not heat rapidly and which will otherwise be comfortable for the user handling same during sport fishing. In a most preferred embodiment, gripping sleeve 50 will be constructed of a rigid, insulative material such as plastic and ideally, a polyvinylcarbonate (PVC) material. Also significant, the layer of adhesive material between the gripping sleeve 50 and the shank portion 40 acts as cushion to lessen or diminish the heating effect of the sun on the different materials, i.e., the metallic rod 20 and the insulative gripping sleeve 50 which because of their different rates of thermal expansion and contraction, have been known to cause problems to other prior art devices. From the foregoing, it will be appreciated by those of ordinary skill in the art that the void which exists between the inner diameter of the gripping sleeve 50 and the external diameter of the shank portion 40, which is almost substantially occupied by adhesive material protects against and prevents the cracking of the gripping sleeve due to the differing thermal expansion rates of the materials used in the assembly. Even so, it will also be appreciated that if desired, the gripping sleeve 50 could be cut away and off of the shank portion and may be replaced by a new gripping sleeve 50.

Referring now to FIG. 3, the present invention is seen to further include a gimbal 60. In the preferred embodiment, gimbal 60 is also made of a metallic material, ideally, aluminum, and includes a insert end 62 and a trailing head portion 64. While the gimbal 60 may be secured to the rod by way of an adhesive material, more preferably, the insert end 62 is structured and disposed to be press-fitted into the second open end 22 of the rod 20 and will therefore, preferably be formed to have an outer diameter which is only slightly smaller than the inner diameter of rod 20. In the preferred embodiment, insert end 62 of the gimbal includes a recess 66 formed therein which is structured and disposed to receive the distal end of the fishing rod blank 70. Trailing head portion 64 includes an enlarged head which upon insertion of insert end 62 into second rod end 24, trailing head portion 64 abuts the perimeter edge of second rod end 24 and will not move further into second rod end 24. Also, it is preferable that the outer diameter of the trailing head portion be generally equal to the outer diameter of the second end 54 of the gripping sleeve 50 so as to offer a finished appearance to the fishing butt and reel seat assembly of the present invention.

From the foregoing, it should now be appreciated that the present invention for a fishing rod butt and reel seat assembly reduces both the manufacturing costs and assembly time needed to yield a finished product over what has previously been known in the art. Specifically, as best shown in FIG.

1 and 6, a single machine or lathe can be used to form the rod 20, even though there are three, varied external diameters thereon in the preferred embodiment, all with a substantially constant inner diameter and means, such as a threaded zone, for securing and retaining a fishing reel thereon. More specifically, an exterior diameter of the abutment segment 39 is larger than an exterior diameter of the reel seat portion 30 and the exterior diameter of the reel seat portion 30 is larger than an exterior diameter of the shank portion 40. If desired, all portions thereof and preferably, at least the largest portion thereof, namely, the shank portion 40 can be left during manufacture with a roughened surface, which again saves time and additional machining costs. A lower annular hood, such as 37 can quickly be press fitted onto the abutment section 39 and the other retaining means assembled in place on the reel seat portion 30. Once an adhesive agent is applied to the shank portion 40 of the rod, the gripping sleeve 50 can then be mounted on the shank portion and the insert end 62 of the gimbal 60 inserted or press fit into rod end 24, to provide a finished device which is substantially strong and able to withstand the large bending forces, loads and otherwise heavy duty use to which it will be subjected during deep sea fishing.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A fishing butt and reel seat assembly designed for use with a fishing reel and a fishing rod blank, said assembly comprising:
   a) a substantially strong, rigid, one piece rod having a first and a second open end and a main length extending between said open ends, a hollow interior in communication with said open ends, said hollow interior having a circular cross-section;
   b) said rod having a reel seat portion and a shank portion;
   c) said reel seat portion including an abutment section with an enlarged exterior diameter,
   d) said abutment section being disposed generally adjacent said shank portion;
   e) retaining means on said reel seat portion for securely retaining the fishing reel on said reel seat portion and including an externally threaded zone and at least one locking nut threadably mounted on said externally threaded zone,
   f) said retaining means further including at least one annular hood slidably mounted onto said reel seat portion and having an inner diameter sized and structured to snugly fit over and be retained on said abutment section of said reel seat portion;
   g) a gripping sleeve having a first and a second open end and a main length extending between said open ends sized to generally correspond to said shank portion of said rod, said gripping sleeve slidably mounted and secured on said shank portion of said rod, said first end of said gripping sleeve disposed in abutting engagement with said abutment section of said reel seat portion; and
   f) a gimble having an insert end and a trailing head portion, said insert end structured and disposed for being press fit into said second end of said rod and said trailing head portion abutting said second end of said rod.

2. A fishing butt and reel seat assembly as recited in claim 1 wherein said retaining means comprise an externally threaded section generally adjacent said first open end of said rod and said reel seat portion, and:
   a) a first and a second annular hood, each hood being structured and disposed to slide over said reel seat portion and to partially receive a foot of the fishing reel;
   b) said first annular hood being disposed adjacent said first open end of said gripping sleeve and defining a lower hood, said second annular hood being disposed generally adjacent said externally threaded zone of said rod and defining an upper hood, with the fishing reel being disposed on said reel seat portion between said first and second annular hoods;
   c) a first and a second internally threaded locking nut, each being removably mounted to externally threaded zone of said rod and being movable therealong, said first locking nut being disposed in abutting engagement with said second upper hood and said second locking nut being disposed in abutting engagement with said first locking nut.

3. A fishing butt and reel seat assembly as recited in claim 2 wherein said first lower hood stoppingly abuts said first open end of said gripping sleeve.

4. A fishing butt and reel seat assembly as recited in claim 1 wherein said gripping sleeve is securely mounted to said shank portion of said rod by a resilient adhesive material.

5. A fishing butt and reel seat assembly as recited in claim 4 wherein said gripping sleeve is constructed of an insulative material.

6. A fishing butt and reel seat assembly as recited in claim 4 wherein said gripping sleeve is constructed of a PVC material.

7. A fishing butt and reel seat assembly as recited in claim 6 wherein said gripping sleeve is formed to have a tapered appearance.

8. A fishing butt and reel seat assembly as recited in claim 4 wherein said gripping sleeve is removable from said shank portion and replaceable with another said gripping sleeve.

9. A fishing butt and reel seat assembly as recited in claim 1 wherein said insert end of said gimbal includes a recess formed therein structured and disposed to receive a distal end of the fishing rod therein.

10. A fishing butt and reel seat assembly as recited in claim 1 wherein said trailing head portion of said gimbal has an exterior diameter which is larger than an exterior diameter of said insert end.

11. A fishing butt and reel seat assembly as recited in claim 10 wherein said trailing head portion of said gimbal has an exterior diameter which is substantially equal to an exterior diameter of said second end of said gripping sleeve.

12. A fishing butt and reel seat assembly as recited in claim 1 wherein an exterior diameter of said abutment section is larger than an exterior diameter of said reel seat portion, and said exterior diameter of said reel seat portion is larger than an exterior diameter of said shank portion.

13. A fishing butt and reel seat assembly as recited in claim 1 wherein said shank portion is provided with a roughened exterior surface.

* * * * *